United States Patent
Payet et al.

(10) Patent No.: US 11,138,119 B2
(45) Date of Patent: Oct. 5, 2021

(54) INCREASING EFFECTIVE CACHE ASSOCIATIVITY

(71) Applicant: Arm Limited, Cambridge (GB)

(72) Inventors: Damien Guillaume Pierre Payet, Antibes (FR); Natalya Bondarenko, Antibes (FR); Florent Begon, Antibes (FR); Lucas Garcia, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/247,912

(22) Filed: Jan. 15, 2019

(65) Prior Publication Data
US 2019/0220414 A1 Jul. 18, 2019

(30) Foreign Application Priority Data

Jan. 17, 2018 (GB) .................................. 1800757

(51) Int. Cl.
*G06F 12/0864* (2016.01)
*G06F 12/0873* (2016.01)
*G06F 12/0871* (2016.01)
*G06F 12/126* (2016.01)
*G06F 12/0815* (2016.01)

(52) U.S. Cl.
CPC ...... *G06F 12/0864* (2013.01); *G06F 12/0815* (2013.01); *G06F 12/0871* (2013.01); *G06F 12/0873* (2013.01); *G06F 12/126* (2013.01); *G06F 2212/6032* (2013.04)

(58) Field of Classification Search
CPC ........................... G06F 12/128; G06F 12/0864
See application file for complete search history.

(56) References Cited

U.S. PATENT DOCUMENTS

| | | | | |
|---|---|---|---|---|
| 5,367,653 A | * | 11/1994 | Coyle | G06F 12/0864 711/128 |
| 2014/0006698 A1 | * | 1/2014 | Chappell | G06F 12/0842 711/105 |
| 2015/0378926 A1 | * | 12/2015 | Busaba | G06F 12/0891 711/141 |
| 2016/0357681 A1 | * | 12/2016 | Reed | G06F 12/0864 |
| 2017/0132147 A1 | * | 5/2017 | Loh | G06F 12/0815 |

OTHER PUBLICATIONS

Bottomley, James, Linux Journal Understanding Caching, Jan. 1, 2004 (Year: 2004).*
Combined Search and Examination Report for GB1800757.5, dated Jul. 12, 2018, 6 pages.

* cited by examiner

*Primary Examiner* — Edward J Dudek, Jr.
(74) *Attorney, Agent, or Firm* — Nixon & Vanderhye P.C.

(57) ABSTRACT

There is provided an apparatus that includes storage circuitry. The storage circuitry is made up from a plurality of sets, each of the sets having at least one storage location. Receiving circuitry receives an access request that includes an input address. Lookup circuitry obtains a plurality of candidate sets that correspond with an index part of the input address. The lookup circuitry determines a selected storage location from the candidate sets using an access policy. The access policy causes the lookup circuitry to iterate through the candidate sets to attempt to locate an appropriate storage location. The appropriate storage location is accessed in response to the appropriate storage location being found.

15 Claims, 7 Drawing Sheets

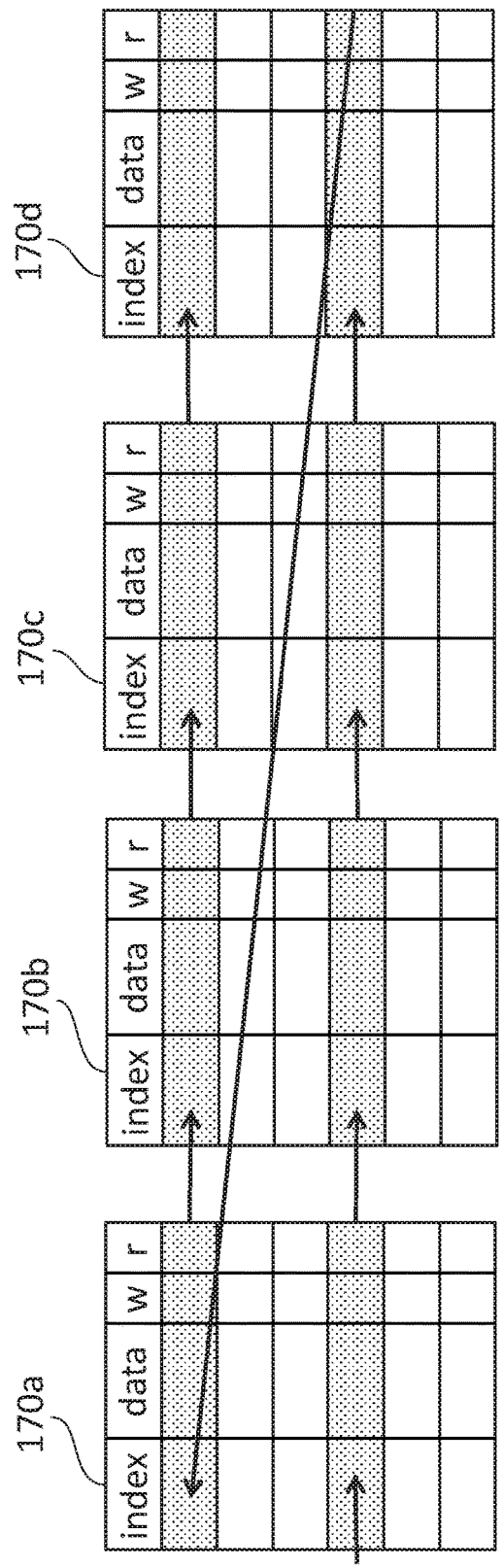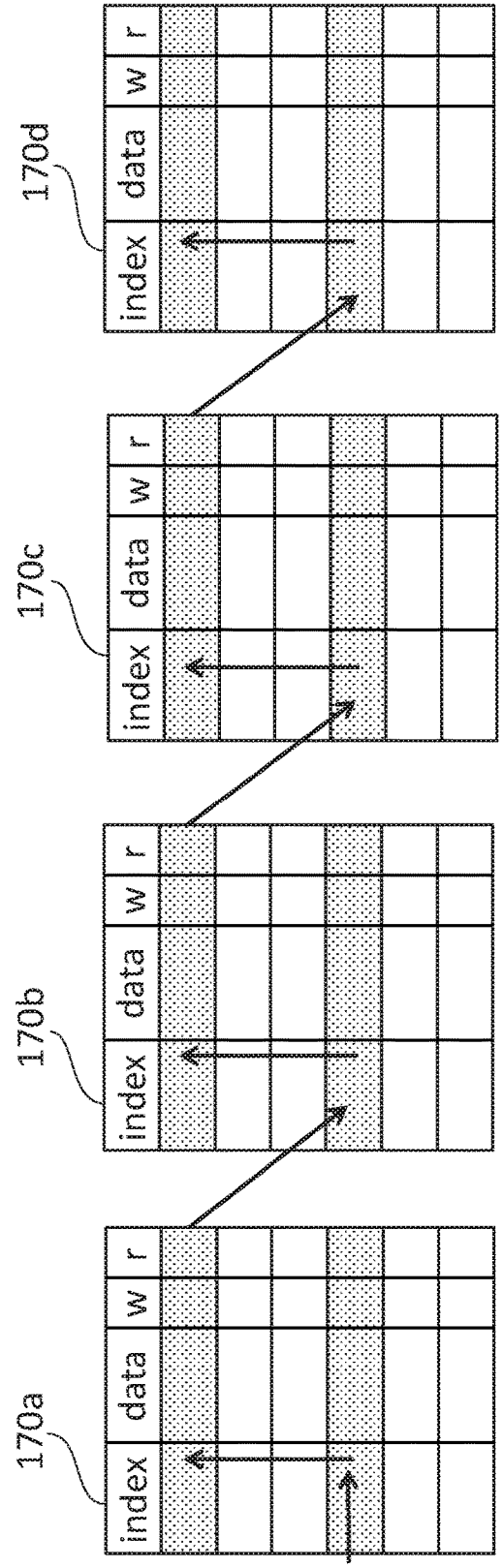
FIG. 3A
FIG. 3b

| index | set | way 0 | way 1 | way 2 | way 3 |
|---|---|---|---|---|---|
| 7 | 4 | rw | | | r |
| 7 | 1 | | rw | | |
| 7 | 2 | | | w | |
| 3 | 0 | | w | | r |
| 3 | 5 | r | | rw | |
| 3 | 6 | | r | | rw |

INCREASING EFFECTIVE CACHE ASSOCIATIVITY

This application claims priority to GB Patent Application No. 1800757.5 filed 17 Jan. 2018, the entire contents of which is hereby incorporated by reference.

The present technique relates to the field of data processing. For instance, the present invention may have relevance to the field of caches.

Direct mapping of storage structure such as a cache is a technique in which, for a given piece of data, there is a single location in the storage structure at which that data can be stored. Such mapping can be problematic, since it can cause data to be removed from the storage structure in order that other data can be stored. One way to resolve this problem is to provide set-associative storage structure in which a piece of data can be stored in multiple locations known as ways. The number of ways can, however, be limited. Sometimes it is desirable to increase the associativity of the storage structure so that data has a greater number of alternative locations for storage. This problem has particular relevance to the use of transactions, in which it is necessary to keep track of all modified data values until such time as the transaction can be completed—causing the modified values to be finalised and written to memory. The associativity of a storage structure can be directly increased. However, this can result in an increase in the amount of circuitry required and can also increase the number of lookups that occur in parallel. This in turn has the drawback of increasing the timing pressures and power consumption for each access to the storage structure.

Viewed from a first example configuration, there is provided an apparatus comprising storage circuitry comprising a plurality of sets, each of the sets comprising at least one storage location receiving circuitry to receive an access request comprising an input address; and lookup circuitry to obtain a plurality of candidate sets corresponding with an index part of the input address, and to determine a selected storage location from the candidate sets using an access policy, wherein the access policy causes the lookup circuitry to iterate through the candidate sets to attempt to locate an appropriate storage location; and wherein the appropriate storage location is accessed in response to the appropriate storage location being found.

Viewed from a second example configuration, there is provided a method of accessing storage circuitry comprising a plurality of sets, each of the sets comprising at least one storage location, the method comprising: receiving an access request comprising an input address; and obtaining a plurality of candidate sets corresponding with an index part of the input address; determining a selected storage location from the candidate sets using an access policy, wherein the access policy causes the lookup circuitry to iterate through the candidate sets to attempt to locate an appropriate storage location; and accessing the appropriate storage location in response to the appropriate storage location being found.

Viewed from a third example configuration, there is provided an apparatus comprising: means for storage comprising a plurality of sets, each of the sets comprising at least one storage location; means for receiving an access request comprising an input address; means for obtaining a plurality of candidate sets corresponding with an index part of the input address; means for determining a selected storage location from the candidate sets using an access policy by iterating through the candidate sets to attempt to locate an appropriate storage location; and means for accessing the appropriate storage location in response to the appropriate storage location being found.

The present technique will be described further, by way of example only, with reference to embodiments thereof as illustrated in the accompanying drawings, in which:

FIG. 1 schematically shows an apparatus in accordance with some embodiments;

FIGS. 3A and 3B show iteration patterns through a cache in accordance with some embodiments;

FIG. 6 illustrates the use of a table for storing available storage locations in accordance with some embodiments.

Figure 1:
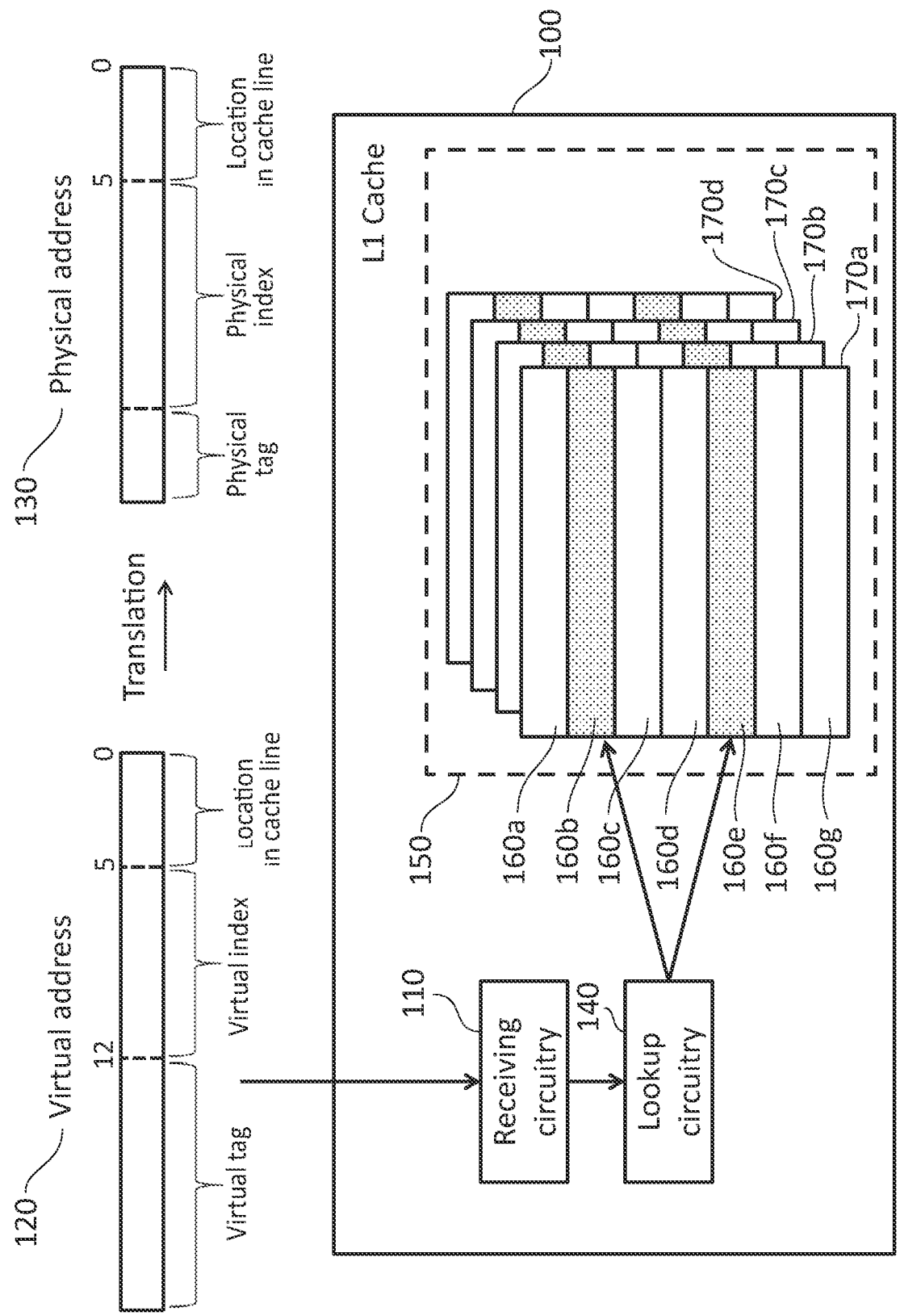

Before discussing the embodiments with reference to the accompanying figures, the following description of embodiments and associated advantages is provided.

In accordance with one example configuration there is provided an apparatus comprising storage circuitry comprising a plurality of sets, each of the sets comprising at least one storage location; receiving circuitry to receive an access request comprising an input address; and lookup circuitry to obtain a plurality of candidate sets corresponding with an index part of the input address, and to determine a selected storage location from the candidate sets using an access policy, wherein the access policy causes the lookup circuitry to iterate through the candidate sets to attempt to locate an appropriate storage location; and wherein the appropriate storage location is accessed in response to the appropriate storage location being found.

The apparatus includes storage circuitry that is made up from a number of sets. Each of the sets comprises at least one storage location. The storage locations associated with a set could take the form of a number of ways. A set can therefore represent a location into which a piece of data can be stored, with the ways providing alternative locations for that data. This can help to resolve the situation in which multiple pieces of data have to be stored in the same set and must therefore compete for storage. When an access request is received, the lookup circuitry accesses the storage circuitry and obtains a plurality of candidate sets from the plurality of sets. This is done using an index part of the input address, which could be a subset of the bits making up the input address. The plurality of candidate sets each correspond with the index part of the input address that is received in the access request, for example, they could be equal. The lookup circuitry determines a selected storage location from the candidate sets using an access policy. Consequently, given the input address, a set of candidate sets is produced from which a selected storage location out of those candidate sets is located using the access policy. The access policy determines the selected storage location by iterating through the sets. If a suitable storage location is determined then that storage location is then accessed. In some embodiments, if no suitable storage location is determined then one of the storage locations can still be accessed, thereby causing an error condition to be triggered. Alternatively, failing to find a suitable location could itself directly trigger an error condition. By performing the access in respect of a storage location within one of the candidate sets, the effective associativity can be improved beyond the number of physical ways that are provided. In effect, the candidate sets become a set of pseudo-ways for the storage circuitry.

In some embodiments the access policy causes the lookup circuitry to iterate through one or more ways for each candidate set. In such embodiments, the access policy causes the lookup circuitry to access each of the ways for a first candidate set. Each of the ways for a second candidate set are then accessed. Each of the ways for a third candidate set are then accessed, and so on, until an appropriate storage location is found.

In some embodiments, the access policy causes the lookup circuitry to iterate through each candidate set for each of one or more ways. In such embodiments, the access policy causes the lookup circuitry to access each of the candidate sets in one way. Each of the candidate sets in a second way is then accessed. Each of the candidate sets in a third way is then accessed, and so on, until an appropriate storage location is found.

In some embodiments, the access request is made during a transaction to indicate that during the transaction, the input address has been read from, or written to. The use of a transaction allows a sequence of instructions to be executed atomically. Accordingly, either the set of instructions is executed in its entirety in effectively the same instant, or none of the instructions is executed. This can be achieved by storing the changes made during a transaction separately until the transaction ends, at which point each of the changes is committed. If, during this process, something occurs that would interfere with the instructions being executed (e.g. one of the changed values is read or one of the relied upon values is written to), then the transaction aborts, and the changes are undone (e.g. rewound). Such interference can be caused as a consequence of instructions outside the transaction attempting to read from or write to locations that are being affected by instructions in the transaction. Accordingly, it is necessary to keep track of addresses that have been read from or written to during the execution of the transaction. This makes it possible to determine whether another instruction (e.g. executed by another processor) causes interference with the transaction.

In some embodiments, the storage circuitry is adapted to store, in association with each storage location, at least one of: a write indicator to indicate whether a physical address stored in that storage location has been written to during the transaction, and a read indicator to indicate whether the physical address stored in that storage location has been read to during the transaction. Each of the write indicator and the read indicator could take the forms of fields within a table that are used to indicate whether the associated physical address has been written to or read from respectively during the transaction. In some embodiments, rather than providing a field, the indicator is the presence of the physical address (or something that indicates the physical address) in a table. Other techniques will be known to the skilled person.

In some embodiments, the access policy attempts to locate the appropriate storage location by locating a storage location storing data relating to the input address. In such embodiments, an attempt is made to locate the most appropriate storage location by looking for an existing storage location that already stores data in respect of the input address. If such an entry can be located then, further data relating to the input address may be storable without significantly increasing the amount of data stored. For example, if there is already an entry that stores the write indicator in respect of the input address then the entry could be expanded to also store the read indicator in respect of that input address (and vice-versa). If such an entry can be located, then there may be no need to perform an eviction in data stored in the storage circuitry. If such a storage location is not found, then a different search may be performed e.g. a less desirable storage location could be found with lower priority.

In some embodiments, the access policy attempts to locate the appropriate storage location by locating an empty storage location. The appropriate storage location determined by the access policy is therefore the first storage location that is encountered by the lookup circuitry as it iterates through the candidate sets. An empty storage location could be considered to be a storage location that contains no data or has been marked as being unset or unused. Accordingly, no data is evicted from the storage circuitry as a consequence of the access request being made. If an empty storage location is not found, then a different search may be performed e.g. a less desirable storage location could be found with lower priority.

In some embodiments, the access policy attempts to locate the appropriate storage location by locating a storage location having a corresponding unset write indicator and a corresponding unset read indicator. Storage locations having a corresponding unset write indicator and a corresponding unset read indicator can be referred to as non-transactional lines. In other words, the storage location may store data that has nothing to do with the state of a transaction. Such data could correspond with data that has been requested from memory and stored as part of the operation of a cache, for instance. Accordingly, if such data is evicted from the storage circuitry, one might expect it to be stored in other storage circuitry such as another cache. In this way the data is not lost and instead data that is used to bring stability to the transaction can be stored in its place. If such a storage location is not found, then a different search may be performed e.g. a less desirable storage location could be found with lower priority.

In some embodiments, the apparatus comprises: further storage circuitry comprising a plurality of further sets, each of the further sets comprising at least one further storage location, wherein the storage circuitry is adapted to store, in association with each further storage location, a read indicator to indicate whether the physical address stored in that further storage location has been read to during the transaction; in response to an evicted storage location being removed from the storage circuitry, the evicted storage location is stored in the further storage circuitry; and the access policy attempts to locate the appropriate storage location by locating a storage location having a corresponding unset write indicator. It could be expected that more data is stored in relation to the read indicator than the write indicator. This is due to data commonly being read more often than being written. Accordingly, in order to store the greater amount of data for which the read indicator is set, a further storage circuitry can be provided. When data having the read indicator is evicted from the storage circuitry the evicted data is instead stored in the further storage circuitry.

In some embodiments, the access policy attempts to locate the appropriate storage location by locating a storage location having a corresponding unset write indicator as a third priority. Accordingly, if no suitable storage location can be found that is already used in relation to the input address, is empty, or is otherwise non-transactional, then an entry that only has a read indicator set could be evicted to the further storage circuitry and replaced in the storage circuitry.

The further storage circuitry could, for instance, take the form of a level two cache. Since a level two cache tends to be bigger, there is more storage available for storing the larger number of input addresses for which the read indicator is to be set.

In some embodiments, the lookup circuitry is adapted, as a final priority, to cause the transaction to abort. If no appropriate storage location can be located, then the lookup circuitry causes the transaction to abort. This occurs because the lookup circuitry is unable to find a storage location into which information regarding which storage locations have been read from or written to can be stored. Consequently, it is no longer possible to keep track of storage locations that must not be interfered with in order to ensure the integrity of the transaction. The transaction must therefore abort. Note that in some embodiments, the lookup circuitry can cause the transaction to abort by selecting an inappropriate storage location and attempting to store data in it. This would ordinarily cause the transactional data to be lost and the transaction to fail.

In some embodiments, the plurality of storage locations is defined by a VIPT aliasing mechanism. Virtually Indexed Physically Tagged caches use a virtual address for determining the index (i.e. set) in the cache that the data is to be stored at. In practise, within a single way, the use of the virtual address in order to provide the index will provide multiple locations. These multiple locations are referred to as aliases. Ordinarily, the physical address (e.g. a small number of bits from the physical address) is used to determine which of these aliases data is to be stored in.

In some embodiments, the apparatus comprises: candidate storage to store at least one indication of at least one of the plurality of storage locations. Where there are multiple storage locations within a single way, it could be computationally expensive to determine each of the different storage locations. Consequently, as an alternative, the storage locations could instead be provided in candidate storage where they can be quickly accessed. In this way, it is not necessary to compute the different candidate storage locations.

In some embodiments, the access request is a write request. Such a write request is used to assign input addresses in association with a write indicator and/or a read indicator.

Particular embodiments will now be described with reference to the figures.

FIG. 1 schematically shows an apparatus 100 in accordance with some embodiments. In this case, the apparatus takes the form of a level one cache 100. The cache includes receiving circuitry 110, which receives an access request. The access request may be received from a CPU and comprises an input address such as a virtual address 120.

The virtual address 120 is made up from a virtual tag, a virtual index and a location in the cache line at which a piece of data can be located. The location in the cache line is given as a byte offset. The virtual address may also be translated into a physical address 130, which corresponds to an address of underlying physical memory. Similarly, the physical address 130 is made up from a physical tag, a physical index, and a location in the cache line at which the desired data can be located.

Using the virtual index lookup circuitry 140 determines a number of candidate sets in the storage circuitry 150. The storage circuitry 150 is made up of a plurality of sets 160a-160g. In this embodiment, each set 160a-160g has four associated ways 170a-170d. Accordingly, four pieces of data corresponding to the same set can be stored simultaneously—one in each of the four ways 170a-170d. In this embodiment, the level one cache 100 takes the form of a Virtually Indexed Physically Tagged (VIPT) cache. Consequently, the sets 160a-160g into which data can be stored is determined based on the virtual index of the virtual address 120. In practice, the use of VIPT yields a plurality of sets into which a piece of data can be stored. Ordinarily, the corresponding physical tag of the physical address 130 can be used to determine which of these different sets (referred to as aliases) a given piece of data should be stored. However, in the present embodiment, the aliases are used as alternative storage locations for a given piece of data. Accordingly, the associativity of the level one cache 100 is increased beyond merely the number of the ways 170a-170d, and instead considers the aliases in addition. For instance, in the embodiment shown in FIG. 1, it is indicated that a given piece of data could be stored in either of two sets 160b, 160e. In addition, for each of these sets 160b, 160e, there exist four ways. Accordingly, the data can be stored in one of eight storage locations. As a result of this, the associativity of the level one cache 100 is increased.

Figure 2:
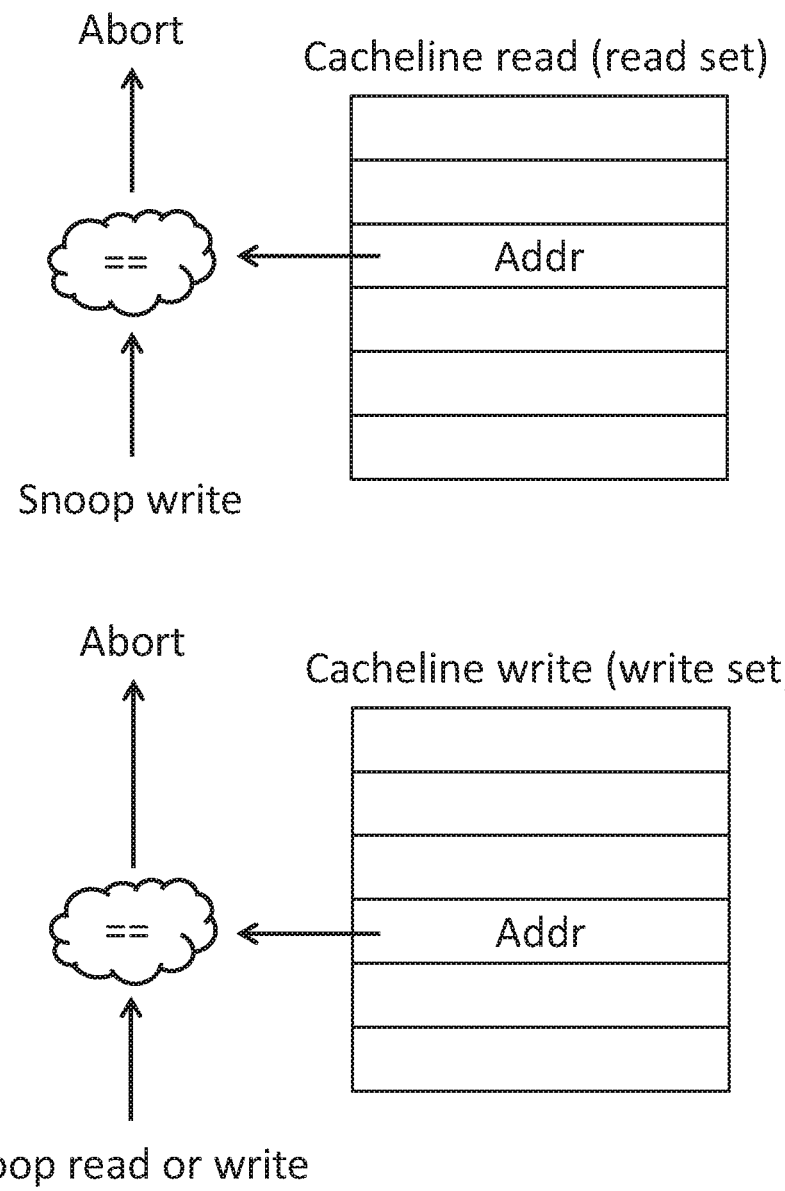
FIG. 2 illustrates the use of read sets and write sets in transactions in accordance with some embodiments.

FIG. 2 illustrates the use of read sets and write sets in transactions in accordance with some embodiments. A transaction may be used in order to encapsulate a set of instructions such that those instructions are executed at effectively the same time. In this way, intervening instructions e.g. as executed by another agent such as another CPU) either see data as it was before the transaction started or see modified data after the transaction is completed. In this way, it is not possible for the agent to read intermediate values of the data part way through the transaction, or to write data midway through the transaction such that the behaviour of the transaction would be changed. It will be appreciated that in either of the circumstances, it is therefore necessary to keep track of data that has been read or written as part of the transaction. In this way, it is possible to determine whether any of that data is read or modified by another agent before the transaction is committed. Typically, the transaction or data is handled by keeping the data in one or more cache lines. Other agents are not permitted to access these cache lines and the cache lines are not written back to memory until the transaction completes.

In this embodiment, an indicator as to whether the address associated with the transactional data is read from or written to is kept. In particular, as shown in FIG. 2, a read set is provided by storing memory addresses that have been read from during the transaction. Similarly a write set is kept by keeping track of the addresses for which data has been written during the transaction. If a snoop write occurs in respect of an address that forms part of the cache line read set, then this would result in the transaction being aborted. This reflects the situation in which another agent such as another CPU attempts to write data to an address that has been read by an instruction being executed during the transaction. This would not be permissible, since it would cause the data being read to change midway through the transaction. Similarly, FIG. 2 illustrates the situation in which either a snoop read or snoop write is issued on behalf of an agent and occurs in respect of an address that data has been written to during the transaction. This is not permissible since it causes a leakage of the data that is part of the transaction. In particular, it is not permissible for data written during a transaction to be accessible to another agent. Accordingly, in such a situation, the transaction is aborted.

Although an increase in associativity can result in more data being read, the present technique only increases the cache's effective associativity for the purposes of storing transactional data and determining whether a transaction abort is to occur. Since this may occur in limited situations, the effective data read rate is kept low as compared to a situation where the physical associativity of the cache is increased.

Using the technique illustrated in FIG. 1, it will be appreciated that a greater number of entries for the cache line read set and the cache line write set can be kept. Without this feature, if it becomes impossible to store each member of the read set and the write set, then it is no longer possible to track the data that should be isolated from other agents and accordingly the transaction must abort. This is done in order to provide integrity to the transaction system.

FIG. 3A illustrates a first pattern of iteration through a cache that may be taken in accordance with an access policy in accordance with some embodiments. As illustrated in FIG. 3A, there are two candidate sets associated with the virtual address provided. In FIG. 3A, the access policy accesses each of the four ways 170a-170d in respect of one of these candidate sets. Having reached the fourth way 170d, it is determined that there are no further ways to be examined. Accordingly, the access policy next checks the second candidate set of each of the four ways starting from the first way 170a.

FIG. 3B represents the opposite. In particular, in FIG. 3B, each of the candidate sets of the first way 170a are attempted, before moving on to the second way 170b. This pattern continues such that each of the candidate sets in a way is considered before moving on to the next way.

In the embodiment shown in the FIGS. 3A and 3B, each set stores the index (virtual index) associated with an input address, together with a write indicator 'w', which indicates whether the associated address is part of the write set, a read indicator which indicates whether the address associated with the index is part of the read set, and a 'data' field that can be used to store additional meta data regarding the entry such as the full input address (rather than just the index). It will be appreciated that since there is a many-to-one mapping between virtual addresses and the indexes, that it becomes necessary to provide a number of possible storage locations for each input address to be stored.

Figure 4:
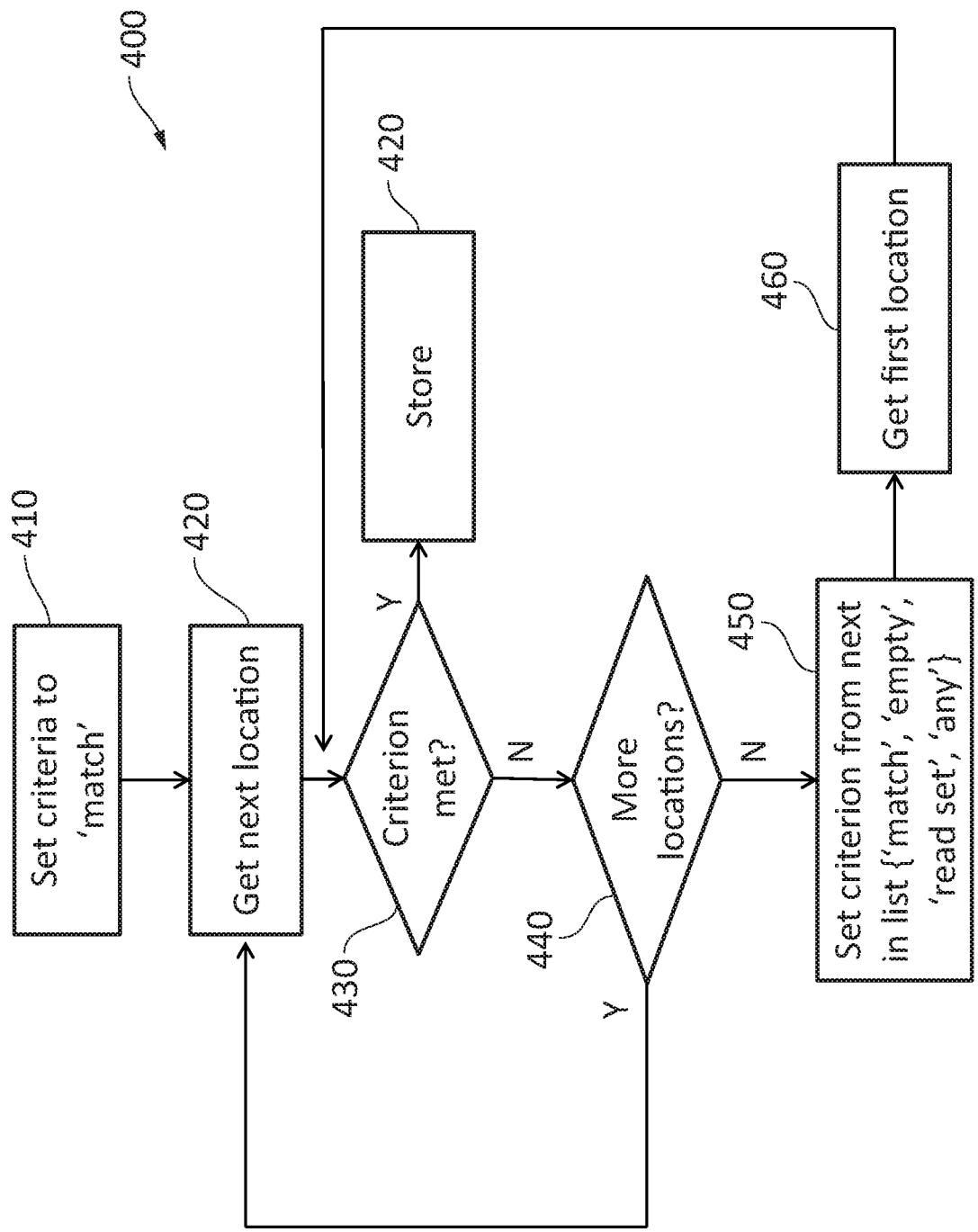
FIG. 4 is of a flowchart that illustrates a process of selecting a suitable storage location in accordance with some embodiments.

Having indicated how the access policy causes the lookup circuitry 140 to iterate through the storage locations, FIG. 4 illustrates the manner in which an appropriate storage location is selected.

FIG. 4 is therefore of a flow chart 400 that illustrates a process as selecting a suitable storage location to store an indication of whether an input address is part of the write set or read set is illustrated in accordance with some embodiments. At a step 410, the criterion is set to 'match' in order to look for an existing entry in the storage circuitry 150 that matches the input address. In this case, an entry in relation to the input address in question will be updated as to being part of the read set or the write set as indicated by the access request. At step 420, the next storage location is obtained. FIGS. 3A and 3B illustrate processes of iterating through each of the storage locations. At step 430, it is determined whether, for the given location, the current criterion is met or not. If so, then at step 420 the access request occurs in respect of the current storage location. Accordingly, the address associated with the access request is stored in a given storage location in combination with whether that location forms part of the read set or the write set. If the criterion is not met at step 430, then at step 440 it is determined whether there are more storage locations to be considered. In particular, step 440 determines whether the iteration process has completed or not. If there are more storage locations to be considered, then the process returns to step 420 where the next storage location is obtained. Alternatively, if there are not more storage locations to consider, then the process proceeds to step 450 where the next criterion is selected from the list. The ordered list of criteria includes 'empty' in which the first storage location that is non-transactional is selected (i.e. having neither the read set indicator or write set indicator set), 'read set' in which the first storage location relating only to a read set is selected, and 'any' in which any storage location is selected. Note that in respect of the criterion 'any' attempting to (or actually) overwriting another transactional entry in the storage circuitry 150 will cause the transaction to be aborted. Accordingly, this criterion represents a fail state. Having selected the new criterion, the first location out of the candidate storage locations is obtained at step 460, and the process then returns to step 430 where it is determined whether the new criterion is met in respect of the first storage location.

In this way, it will be appreciated that as a first priority the access policy attempts to select a storage location that already corresponds with the input address. As a second priority, the access policy attempts to select an empty storage location that is non-transactional. As a third priority, the access policy attempts to select an entry that only relates to a read set. In other words, the access policy attempts to select the first storage location not comprising a set write indicator. Finally, as a final priority, the access policy selects any storage location. Since previous attempts to select a storage location have failed, this will result in attempting to overwrite an entry that is required to provide transactional integrity. Consequently, this will cause the transaction to fail. In other embodiments, of course, a subset of these criteria could be used. Indeed, in some embodiments, the ordering of the criteria could be changed.

Figure 5:
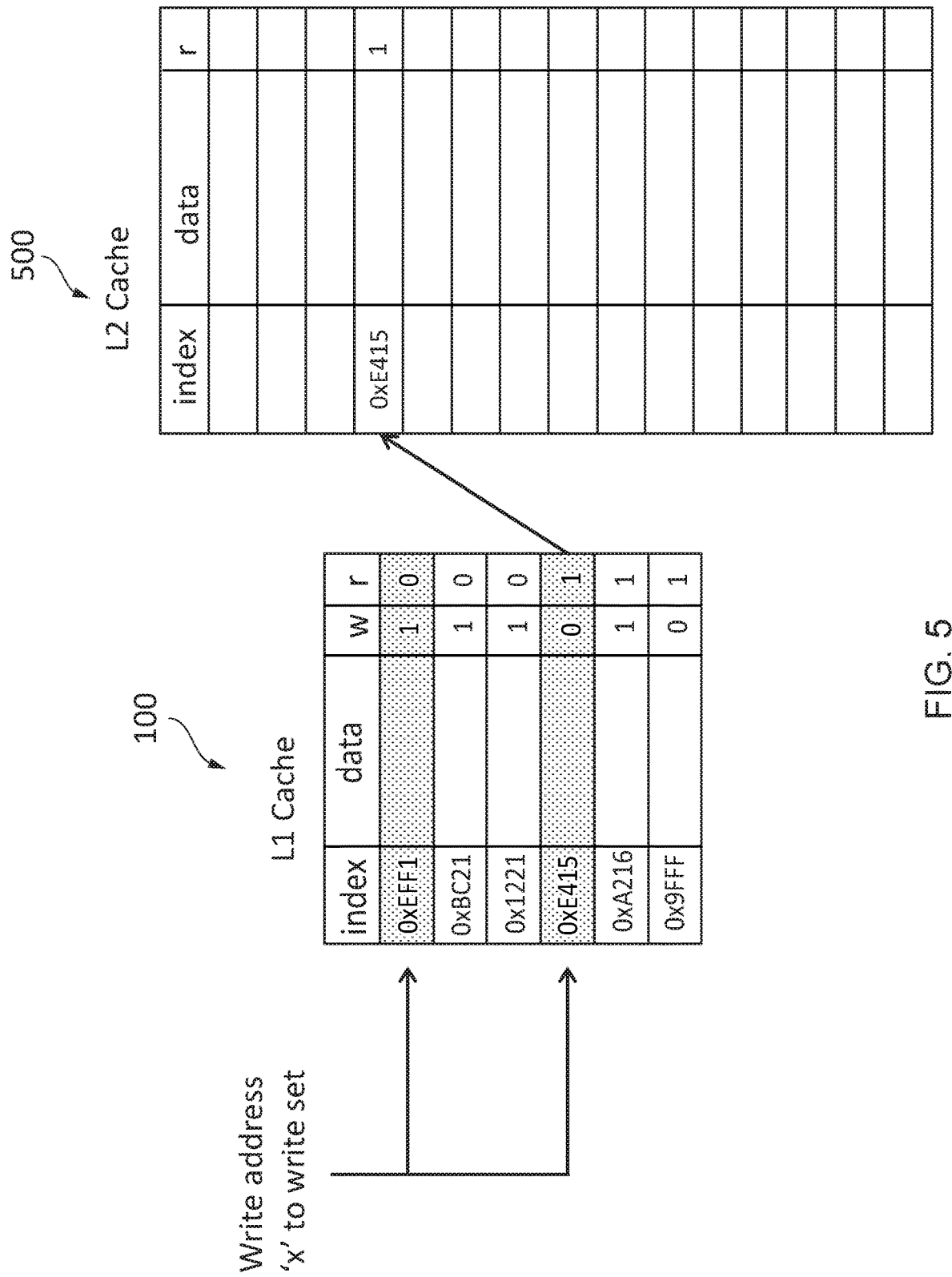
FIG. 5 shows the use of multiple levels of cache in accordance with some embodiments.

FIG. 5 illustrates an embodiment in which multiple levels of cache are used in accordance with some embodiments. As previously explained, as a penultimate or final priority, the access priority can cause the storage circuitry to store a new entry in such a way that it replaces or overwrites an entry in the storage circuitry 150 relating only to a read set. In such situations, the entry that is overwritten is evicted from the level one cache 100 and is instead stored in a level two cache 500. Typically, a level two cache 500 is significantly bigger than a level one cache 100 and can therefore store more data. Additionally, in many embodiments, the number of entries relating to only a read set will be significantly bigger than the number of entries relating to a write set. This is because in general, there are more instructions directed to reading data than to writing data. Consequently, only the entries relating to read set membership are evicted from the level one cache 100 into the level two cache 500. Consequently, in this embodiment, the level two cache 500 stores only the read set indicator, and not the write set indicator. Of course, in other embodiments, the level two cache could be extended and treated as an extension of the level one cache 100 by storing any entry.

In the event that an entry is evicted into the level two cache 500 and subsequently becomes part of the write-set, the entry will be reimported into the level one cache 100.

In the embodiments shown until this point, there have been two candidate sets. However, it will be appreciated that there could be any number of candidate sets. Calculating all of these and iterating through them could be time consuming. Accordingly, in the embodiment shown in FIG. 6, candidate storage 600 is provided in order to indicate, for a given index, what the sets are that can be used. For instance, FIG. 6 illustrates that for an index of 7, the candidate sets include sets 4, 1, and 2. Similarly, for an index of 3, the other candidate sets include sets 0, 5, and 6. Having determined the set, it is possible to index into the relevant table that stores the transactional (read/write) indicators across the multiple ways.

Figure 7:
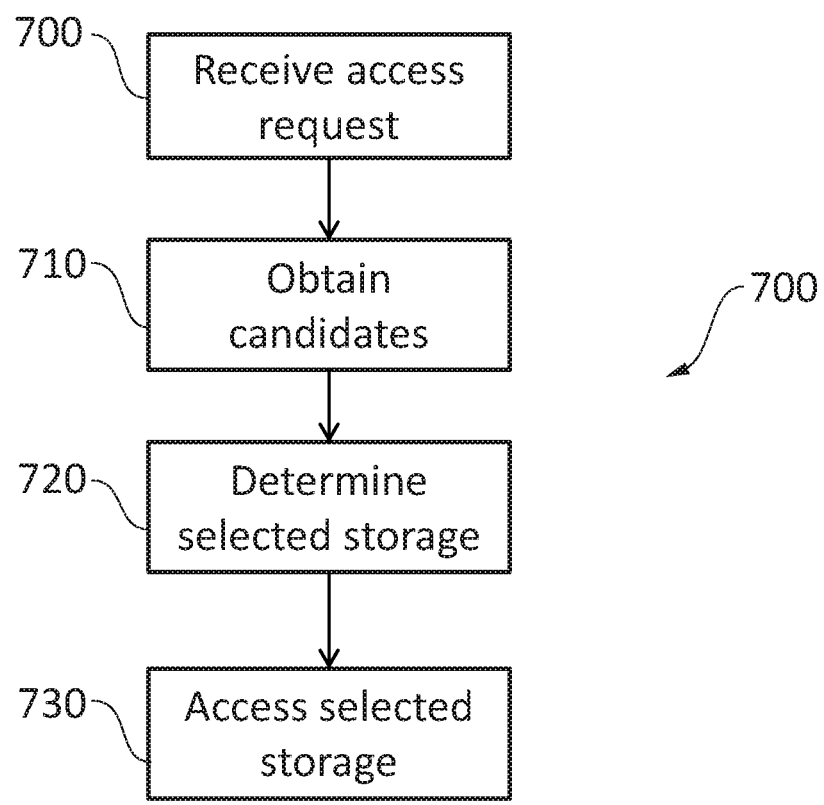
FIG. 7 illustrates a method in accordance with some embodiments.

FIG. 7 illustrates a flow chart that shows a method in accordance with some embodiments. At a step 700, an access request is received. At step 710, candidate sets are determined that correspond with an input address provided in the access request. At a step 720, a storage location is determined from the candidate sets. This is achieved using an access policy that iterates through the candidate sets. An appropriate storage location is then selected. Finally, at a step 530, the selected storage location is accessed in accordance with the access request.

In accordance with the above, it will be appreciated that the effective associativity of the underlying storage circuitry can be improved. Whereas a set of candidate sets are provided, these candidates are provided as alternative locations for which data can be stored. In this way, the number of locations which a given piece of data can be stored is increased. In addition, for each storage location, there may be any number of ways associated. For X ways, if the number of candidate storage locations is increased by N, then the number of new storage locations into which data can be stored is increased by NX. This is achieved without increasing the physical associativity of the underlying storage location, which would cause the latency for access requests to increase.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
storage circuitry comprising a plurality of sets, each of the sets comprising at least one storage location;
receiving circuitry to receive an access request comprising an input address; and
lookup circuitry to obtain a plurality of candidate sets corresponding with an index part of the input address, and to determine a selected storage location from the candidate sets using an access policy,
wherein the access policy causes the lookup circuitry to iterate through the candidate sets to attempt to locate an appropriate storage location;
wherein the appropriate storage location is accessed in response to the appropriate storage location being found; and
wherein the apparatus further comprises candidate storage to store; a plurality of mappings, wherein each of the mappings corresponds to a different index; and
wherein the mappings are individually changeable.

2. An apparatus according to claim 1, wherein
the access policy causes the lookup circuitry to iterate through one or more ways for each candidate set.

3. An apparatus according to claim 1, wherein
the access policy causes the lookup circuitry to iterate through each candidate set for each of one or more ways.

4. An apparatus according to claim 1, wherein
the access request is made during a transaction to indicate that during the transaction, the input address has been read from, or written to.

5. An apparatus according to claim 4, wherein
the storage circuitry is adapted to store, in association with each storage location, at least one of:
a write indicator to indicate whether a physical address stored in that storage location has been written to during the transaction, and
a read indicator to indicate whether the physical address stored in that storage location has been read to during the transaction.

6. An apparatus according to claim 5, wherein
the access policy attempts to locate the appropriate storage location by locating a storage location storing data relating to the input address.

7. An apparatus according to claim 5, wherein
the access policy attempts to locate the appropriate storage location by locating an empty storage location.

8. An apparatus according to claim 5, wherein
the access policy attempts to locate the appropriate storage location by locating a storage location having a corresponding unset write indicator and a corresponding unset read indicator.

9. An apparatus according to claim 5, wherein
the access policy attempts to locate the appropriate storage location by locating a storage location having a corresponding unset write indicator and a corresponding unset read indicator.

10. An apparatus according to claim 5, comprising:
further storage circuitry comprising a plurality of further sets, each of the further sets comprising at least one further storage location, wherein
the storage circuitry is adapted to store, in association with each further storage location, a read indicator to indicate whether the physical address stored in that further storage location has been read to during the transaction;
in response to an evicted storage location being removed from the storage circuitry, the evicted storage location is stored in the further storage circuitry; and
the access policy attempts to locate the appropriate storage location by locating a storage location having a corresponding unset write indicator.

11. An apparatus according to claim 10, wherein
the access policy attempts to locate the appropriate storage location by locating a storage location having a corresponding unset write indicator as a third priority.

12. An apparatus according to claim 4, wherein
the lookup circuitry is adapted, as a final priority, to cause the transaction to abort.

13. An apparatus according to claim 1, wherein the plurality of storage locations is defined by a VIPT aliasing mechanism.

14. An apparatus according to claim 1, wherein the access request is a write request.

15. A method of accessing storage circuitry comprising a plurality of sets, each of the sets comprising at least one storage location, the method comprising:

receiving an access request comprising an input address; and obtaining a plurality of candidate sets corresponding with an index part of the input address including accessing candidate storage to store a plurality of mappings, wherein each of the mappings corresponds to a different index, wherein the mappings are individually changeable;

determining a selected storage location from the candidate sets using an access policy, wherein the access policy causes the lookup circuitry to iterate through the candidate sets to attempt to locate an appropriate storage location; and accessing the appropriate storage location in response to the appropriate storage location being found.

* * * * *